July 11, 1939.　　　A. STEPHENSON　　　2,166,078
METAL PIPE JOINT
Filed Oct. 24, 1936　　　2 Sheets-Sheet 1
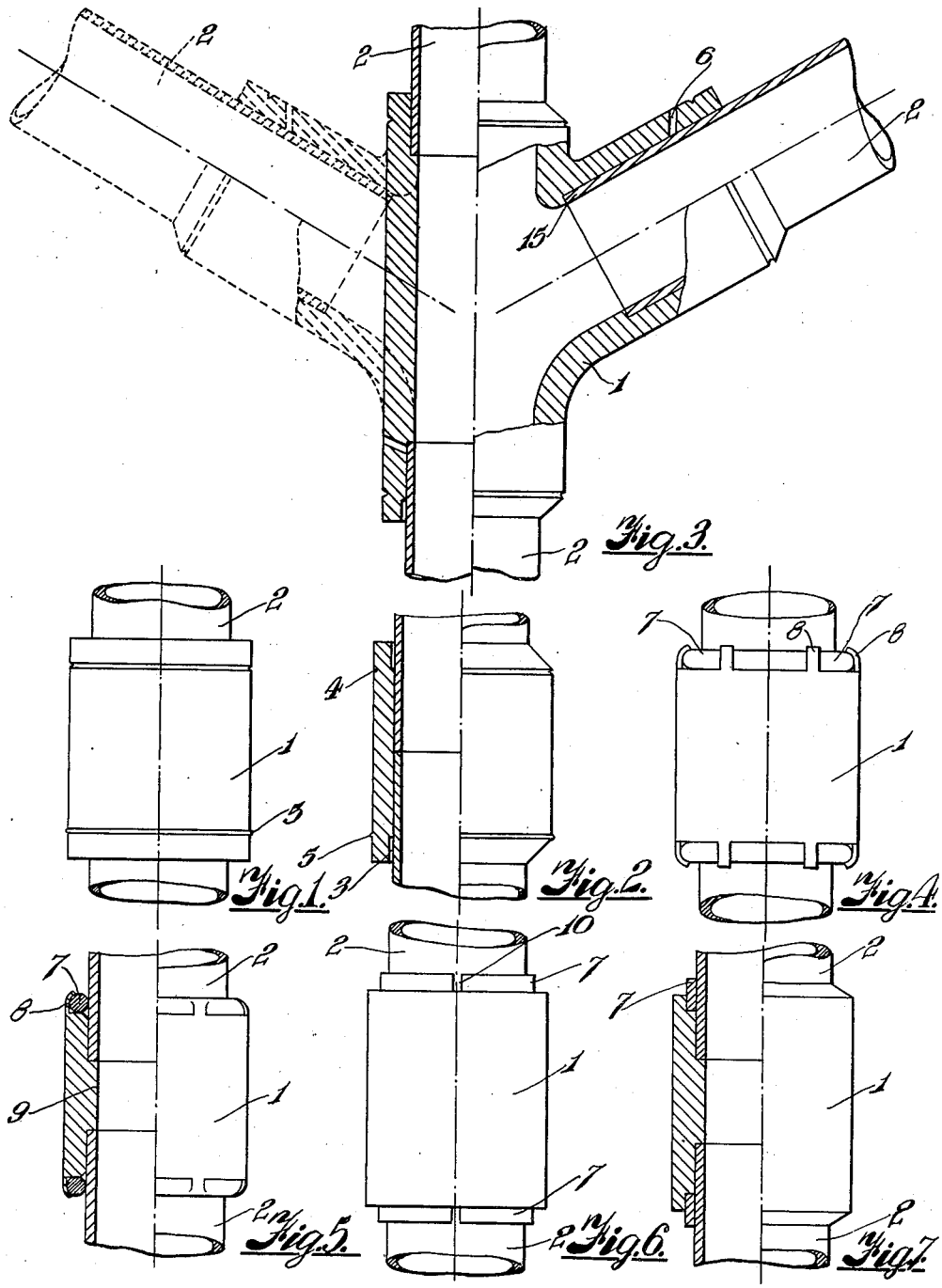
INVENTOR
ARTHUR STEPHENSON
By Norris & Bateman
His Attorneys

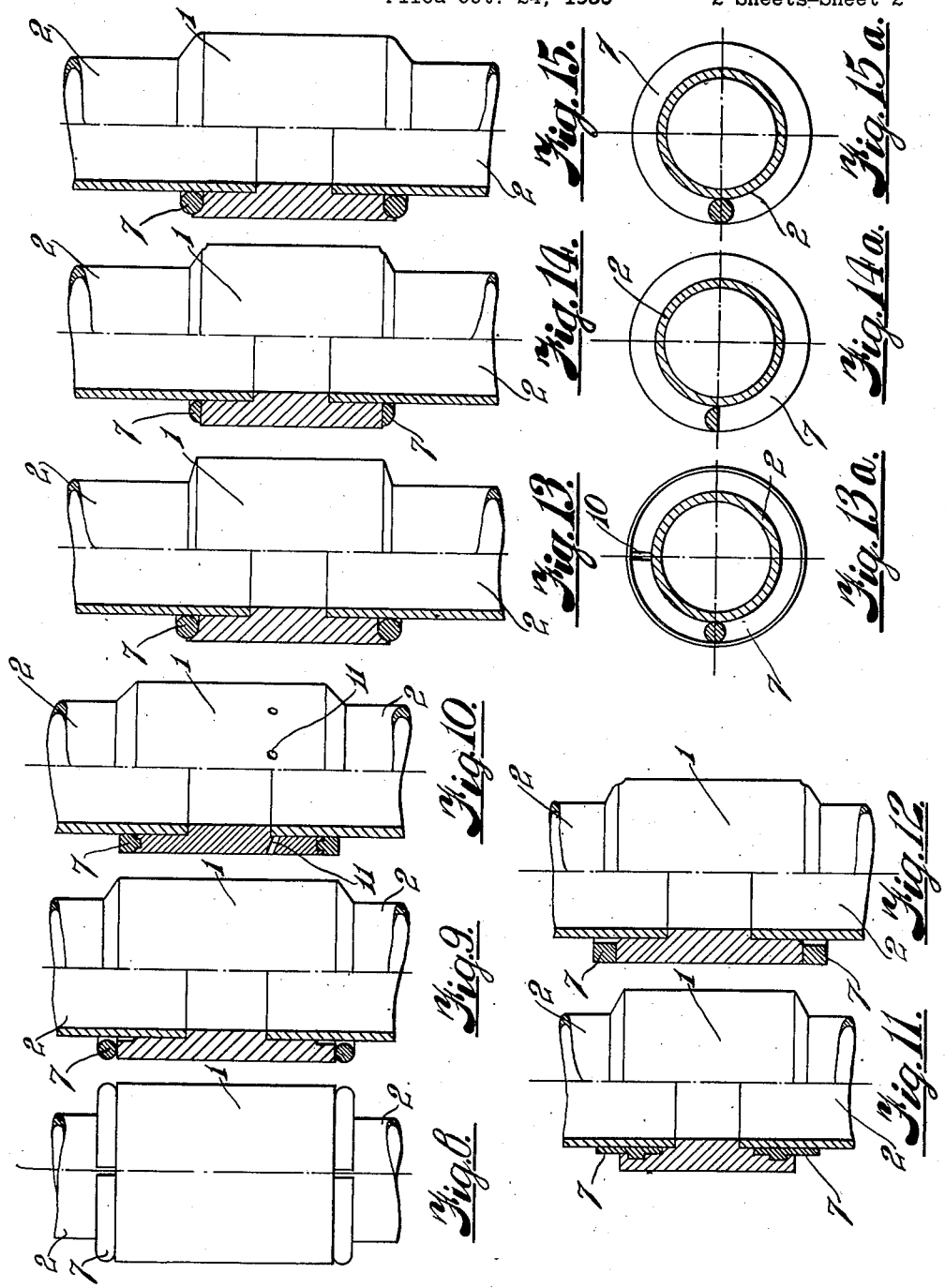
July 11, 1939.  A. STEPHENSON  2,166,078
METAL PIPE JOINT
Filed Oct. 24, 1936  2 Sheets-Sheet 2
INVENTOR
ARTHUR STEPHENSON
By Norris + Bateman
His Attorneys

UNITED STATES PATENT OFFICE 2,166,078

METAL PIPE JOINT

Arthur Stephenson, Westminster, London, England, assignor to The British Oxygen Company Limited, Westminster, London, England, a British company Application October 24, 1936, Serial No. 107,489
In Great Britain July 27, 1936

3 Claims. (Cl. 285—115)

The present invention relates to improvements in connection with metal pipe joints and has for its object to provide an improved joint for metal pipes, and has more particular reference to pipe joints such as are used in gas, water, sanitary and like fluid conveying installations, wherein it is necessary or desirable to maintain at the location of joint, continuity of internal surface coincident with that of the pipe system.

One of the difficulties normally met with in the formation of joints in metal pipe junctions which are completed and rendered fluid tight by melting metals onto or into the joint by processes such as welding, brazing, or soldering, is that of retaining the ends of pipes to be joined in appropriate alignment with each other and/or with the internal contour of the fitting especially in the case of curved or branch pipes, and of ensuring a continuity of internal contour without internal cavities, projections or excrescences where the jointing operation has been performed. Should axial displacement or failure to maintain continuity of the contour result during the process of jointing, the interior of the bore of the service is irregular and spaces or pockets are formed which permit of lodgment and accumulation of sedimentary or other matter which may be separable from the fluid conveyed. Moreover, if the metal which is melted onto or into the joint is of low surface tension and comparatively fluid under heat, there is a further tendency for it to run down and overfill any cavity or cavities and thereby form globules and projections on the internal surfaces at the joint which cannot be detected but form an obstruction on the interior of the conduit.

A further difficulty more particularly met with when the joints have to be completed after the pipes are in situ, as is now frequently the case, is that the surface at which the joint is to be completed on the terminal end of the jointing fitting may not be at a convenient angle to permit of uniform distribution and penetration of the metal fused onto or into the joint for the purpose of completing it. Special difficulty arises from this source when the surface of the joint is inverted so that the joint has to be completed from the under-side.

When the metal which is melted onto or into the joint is not of predetermined quantity, there is no convenient means of determining from subsequent examination whether or not sufficient metal has been incorporated in the joint to provide the requisite strength or to ensure that there is freedom from projections or globules on the internal surface.

The objects of the present invention are to provide convenient means of overcoming the above-mentioned difficulties as well as to facilitate and ensure the making of strong and efficient joints which are properly aligned and which have uniformity of internal contour, free from cavities and/or obstructive projections, and in which the amount of metal melted into or onto the joint is in predetermined amount irrespective of the position or angle of the extremity of the fitting when the joint is completed.

The invention consists in the formation of joints for metal pipes and the method of completing the joint between the pipe ends and the fitting and comprises a union sleeve or multiple branch fitting of metal which, in addition to being provided with a socket within the fitting to receive and locate each of the ends of the pipes to be joined, for the purpose of proper location and alignment, is either made entirely of metal or metallic alloy of lower melting point than that of the pipes to be joined, or is provided at its terminal end or ends with predetermined amounts of the lower melting point metal or alloy, in such a manner that the whole or part of the metal to be melted is exposed for direct contact of the blow pipe flame or other equivalent means of heating, and that the predetermined amount of metal is either united with the terminal ends of the fitting or is retained in position adjacent thereto in such a way that it remains located in position at or in the terminal end of the fitting, no matter what position, angle, or location the fitting is placed in at the time the final jointing operation is carried out.

Where the entire fitting is made of lower melting point metal or alloy than the pipe, the surface tension of the metal or alloy when melted by local intense heating as with a blow pipe flame is designedly high, so that the body fitting retains its strength and shape during the process of fusing the metal at the terminal ends for jointing. The joint is made by fusing a predetermined portion at the extremity of the fitting to the adjacent portion of the surface of the pipe whilst the socket within the fitting retains the pipe in the desired position.

Where the fitting is made of a higher melting point material than that indicated above, i. e., similar to that of the pipe, it is provided with predetermined amounts of the lower melting point metal or alloy at its terminal ends, the metal or alloy may be attached permanently on to the end of the fitting by welding, burning or casting on, or may be fitted to extensions or into recesses or housings provided in the terminal ends of the fitting for its reception or it may be so formed as to slidably grip the outer surface of the pipe. The lower melting point metal or alloy may be in continuous or discontinuous rings but is of suitable section and shape and size to provide the predetermined amount requisite for the joint and to permit the passage of the pipe end into the socket in the fitting, and to fit into any recess or housing preferably extending outwards beyond the terminal end of the fitting to permit direct contact with the blow pipe flame or other heating medium and to provide the necessary volume of metal to seal the joint between the pipe and the fitting after melting. Where the external diameter of the pipe varies for any given bore, due to different thickness of metal in the wall of the pipe, the predetermined amount of metal which is fitted into and projects beyond the terminal ends of the fitting is made of suitable thickness to compensate for the altered thickness of the pipe wall, so that within reasonable limits the internal dimensions of the socketed and recessed terminal ends of the fitting may remain the same for pipes of different wall thicknesses. It is preferable that the lower melting point metal or alloy shall have a comparatively high surface tension when melted in order to overcome the tendency for running downwards and through the joint so that it does not form internal projections and excrescences on the internal contour and so as to avoid irregularities in the section of metal about the joint due to gravitation when in the melted condition which is the common defect with brazing alloys and solders which are of comparatively low melting point and have low surface tension.

Where it is essential that the small hiatus between the external surface of the pipe and the internal surface of the socket provided in the fitting for alignment shall be completely filled, the joint may be made at its either end in the manner described above by the use of metal of high surface tension when melted, then filled with low surface tension material such as brazing or soldering alloy or other suitable filling agent which can be melted in and finally sealed at its upper end with the metal of higher surface tension.

In order that the invention may be fully understood several embodiments thereof will now be described with reference to the accompanying drawings in which:

Figures 1 and 2 show one form of straight pipe joint construction according to the invention, Figure 3 shows a multiple branch joint with one type of terminal end, Figures 4 and 5 show a modified form of straight joint pipe construction suitable for compensating for differences in thickness of pipe wall, Figures 6 and 7 show another modification, also suitable for compensating for different thickness of pipe wall, Figures 8 and 9 show another modification in which the metal to be added is retained on the pipe end and Figures 10–15a show further modifications of which the types shown in Figures 11 and 13 are more particularly adapted to compensating for different thicknesses of pipe wall.

Referring first to Figs. 1 and 2 of the drawings, 1 represents a union sleeve in the form of a straight cylinder designed to receive the pipe ends 2 in the manner shown so that the pipe ends abut against one another within the sleeve, and are held in proper alignment therein.

The sleeve 1 is made entirely of a metal or metallic alloy of lower melting point than that of the pipes to be joined and is internally recessed at its ends as shown at 3 so as to provide fusible joint-forming members which are integral with the sleeve. The sleeve is formed with external annular grooves as shown at 4 or annular ridges as shown at 5, by which the portions of the sleeve which are intended to be fused for the purpose of joining the sleeve to the pipe ends are clearly marked off from the main body of the sleeve. These grooves or ridges serve as a guide to indicate the amount of metal which should be caused to flow to make a joint. The material of the sleeve is so chosen that the melted metal has a high surface tension with the result that it remains at the extremity of the fitting and clings to the sleeve and pipe in making the joint. The joint is made by fitting the pipe ends into the sleeve as shown in Fig. 1 and at the left-hand side of Fig. 2 of the drawings and then heating the ends of the sleeve and the adjacent surface of the pipe by means of a blow pipe flame, preferably an oxy-acetylene flame or equivalent heater so as to cause them to fuse together and thereby join the sleeve or fitting to the pipe ends. The finished joint approximates to the appearance shown in elevation at the right-hand side of Fig. 2 of the drawings.

Fig. 3 of the drawings shows a joint of the same character as that shown in Figs. 1 and 2 applied to a multiple branch joint. In the construction shown in Fig. 3 a multiple branch fitting 1 takes the place of the straight sleeve 1 of Figs. 1 and 2 and the branches of this fitting are internally shouldered as shown at 15 to abut the ends of the pipes 2, the construction being such that when the ends of the pipes are fitted into the sockets provided for them the interior of the joint will be smooth and free from cavities and/or obstructive projections. The whole of the multiple branch fitting 1 is made of metal or metallic alloy of lower melting point than that of the pipes to be jointed and is formed at its ends with fusible jointing parts like those previously described with reference to Figs. 1 and 2.

Fig. 3 of the drawings also shows an additional feature consisting of holes 6 drilled through the walls of the fitting 1 at an inclination to the normal. These holes facilitate the introduction of filling metal of low surface tension when melted such as brazing or soldering metal into the joint between the pipe end and the interior of the socket part of the fitting 1.

Figs. 4 and 5 show a modified form of joint in which the sleeve 1 is made of a metal which is not of low melting point and is not fused during the jointing operation but is fitted at its ends with separate fusible jointing members in the form of rings 7 which closely fit round the pipe ends as shown and which are attached to the sleeve 1 by means of ears or lugs 8 formed on the ends of the sleeve 1. These lugs are bent inwards as shown so as to hold the rings 7 in position while the joint is being made and may be melted off either during or subsequent to the joint being made.

As can be seen in Fig. 5 of the drawings the sleeve 1 is formed with a part 9 of reduced interval diameter which forms shoulders to abut the ends of the pipes. The internal diameter of the part 9 is made equal to that of the pipes to be jointed so that the finished joint has a smooth internal contour free from cavities and/or obstructive projections. The process of making the joint is similar to that described with reference to Figs. 1 and 2. The rings 7 are fused onto the ends of the sleeve and the adjacent surface of the pipe so that the pipe ends are securely joined at the extremity of the sleeve 1.

Figs. 6–15a of the drawings show a number of variations of the construction shown in Figs. 4 and 5 in all of which the sleeve 1 is made of a material which is not readily fusible at the jointing temperature, the fused joint being made by means of preformed more fusible jointing members in the form of rings 7 fitted to or located at the ends of the sleeve.

As shown in Figs. 6 and 7, the ring 7 which is broken as shown at 10, is pushed into a recess 11 provided in the end of the sleeve 1 and is held in place by its own resilience, the ring 7 being compressed before it is inserted into the recess 11 so that it tends to expand therein. The thickness of the ring is selected so that it will bear firmly against the outside of the pipe when the pipe is inserted.

In the construction shown in Figs. 8 and 9 of the drawings the rings 7 are pushed on to the pipe ends and held in place when the joint is assembled by their grip on the pipe ends. The rings are preferably broken as shown at 10 and are expanded by the pipe ends when placed in position.

In the construction shown in Figs. 10, 11 and 12, the rings 7 are cast or fused on to the ends of the sleeve 1. Figs. 10 and 11 show two arrangements in which the rings 7 are keyed to the ends of the sleeve 1 by being cast or fused into undercut grooves formed therein. The sleeve 1 shown in Fig. 10 also has openings 11 through which molten metal can be introduced into the interior of the sleeve 1 in contact with the ends of the pipe 2.

As an alternative method of constructing the ring 7 in Fig. 11, it may be preformed and split or may be in more than one sectional piece so that it can be inserted on the housing or recess located in the sleeve 1 before the pipe end is inserted so that when inserted the pipe end serves to retain the ring in position in its housing, different thicknesses of ring being used to correspond with the external diameter of the pipe in respect to its bore and particularly to the internal dimensions of the fitting.

In the construction shown in Figs. 13 and 13a of the drawings the ring 7 is split as shown at 10 and is lodged in a recess formed in the end of the sleeve 1, the construction being such that the ring tends to expand in this recess or is expanded into the recess when the pipe end is inserted and is thereby held in place, rings of larger or smaller section being used according to the external diameter of the pipe.

As shown in Figs. 14 and 14a of the drawings a ring of approximately semi-circular section is secured to the flat end of the sleeve 1. The approximately semi-circular shape corresponds to the form normally produced when the alloy is progressively deposited by fusion into the end of the sleeve 1.

Figs. 15 and 15a of the drawings show a construction in which a ring of circular section is secured to the flat end face of the sleeve 1 by continuous or discontinuous welding or soldering.

In all the constructions shown the preformed fusible jointing member, whether it be formed integral with the sleeve 1 as shown in Figs. 1 and 2 or attached thereto as shown in the other figures, is accessible to the local heating medium applied when the joint is assembled, so that it can be melted by the direct action of a flame, or other convenient means of heating. Consequently, the joint can be made without heating the sleeve to such an extent as would be necessary if the joint-forming element had to be fused by the transmission of heat through the wall of the sleeve.

It will be understood that all the methods of attaching or locating the predetermined amounts of fusible material to the terminal ends of the sleeves as shown in the drawings are equally applicable to multiple fittings intended for joining together more than two pipe ends.

I claim:

1. A socket or fitting structure having at least one recess for reception of an end portion of a conduit, said structure comprising a body portion having connected thereto a preformed ring of material having a relatively low melting point and designed to fuse below the fusion temperature of the conduit for which the fitting is adapted, whereby the periphery of said ring is at least partially exposed and accessible to direct application of heat for fusing said ring to form a joint.

2. A pipe socket or fitting structure comprising a body having at least one recess for reception of a pipe terminal, and a preformed fusible ring member carried by said body adjacent the open end of said recess, said member being partially confind by the recess and extending axially thereof to a material extent beyond said recess for external exposure to direct heat application.

3. A pipe socket or fitting structure comprising a body having at least one recess for reception of a pipe terminal, and a preformed fusible ring member of lower melting point than said body positioned adacent the pipe-receiving end of said recess within said body, said body at said open end having a plurality of lugs securing said ring member to said body and providing relatively wide and closely spaced apertures or notches around its periphery to afford direct heat application to portions of the periphery of said fusible member.

ARTHUR STEPHENSON.